(12) United States Patent
Sharifipour et al.

(10) Patent No.: US 10,432,082 B1
(45) Date of Patent: Oct. 1, 2019

(54) METHOD AND APPARATUS FOR CURRENT CONTROL IN INPUT POWER ADAPTERS FOR A DC BUS-BASED POWER ROUTER

(71) Applicant: Katerra, Inc., Menlo Park, CA (US)

(72) Inventors: Bahman Sharifipour, Newington, NJ (US); Jumie Yuventi, Sacramento, CA (US); Mark Thomas, Cupertino, CA (US)

(73) Assignee: Katerra, Inc., Menlo Park, CA (US)

( * ) Notice: Subject to any disclaimer, the term of this patent is extended or adjusted under 35 U.S.C. 154(b) by 0 days.

(21) Appl. No.: 16/267,159

(22) Filed: Feb. 4, 2019

(51) Int. Cl.
*H02M 1/10* (2006.01)
*H02M 7/12* (2006.01)
*H02M 3/10* (2006.01)

(52) U.S. Cl.
CPC ............ *H02M 1/10* (2013.01); *H02M 3/10* (2013.01); *H02M 7/12* (2013.01)

(58) Field of Classification Search
CPC ............ H02M 1/10; H02M 3/10; H02M 7/12
See application file for complete search history.

(56) References Cited

U.S. PATENT DOCUMENTS 4,255,789 A * 3/1981 Hartford ............... F02D 41/263
123/406.65

* cited by examiner

*Primary Examiner* — Adolf D Berhane
*Assistant Examiner* — Afework S Demisse
(74) *Attorney, Agent, or Firm* — Elliott, Ostrander & Preston, P.C.

(57) ABSTRACT

An electrical power input adapter coupled to a direct current (DC) bus in a power distribution system receives either an alternating current (AC) power signal or a DC power signal at a first voltage level to transmit to the DC bus. An electrical converter receives and converts the received signal to a DC power signal at a second fixed voltage. A second interface includes a current limiter to receive and limit an amperage of the DC power signal at the second voltage. A programmable switch coupled to the current limiter receives the DC power signal at the second voltage and at the limited amperage and transmits the DC power signal at the second voltage and at the limited amperage. A controller coupled to the programmable switch controls when, within a period of time, the programmable switch is to transmit the DC power signal at the second voltage and at the limited amperage. An integrator receives the DC power signal at the second voltage and at the limited amperage when transmitted within the period of time and converts it to a DC power signal at the second voltage and at a second amperage that is proportional to the limited amperage integrated over the period of time.

10 Claims, 4 Drawing Sheets

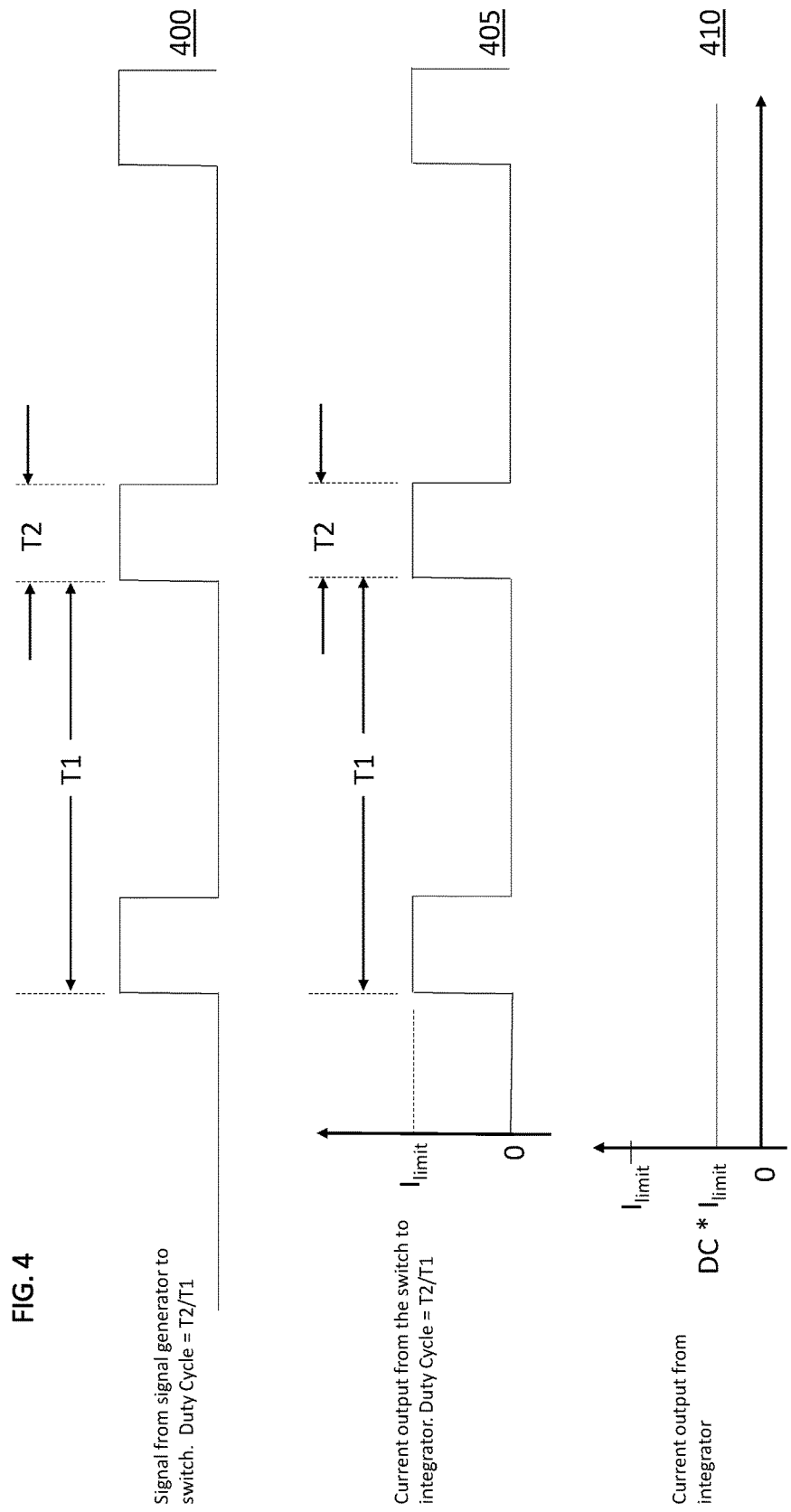

US 10,432,082 B1

METHOD AND APPARATUS FOR CURRENT CONTROL IN INPUT POWER ADAPTERS FOR A DC BUS-BASED POWER ROUTER

TECHNICAL FIELD

Embodiments of the present invention relate to electrical power distribution systems and methods. In particular, embodiments of the invention control an amount of direct current being driven from an input power adapter to a direct current (DC) bus in a power router or electrical power distribution system that routes power from a plurality of electrical power inputs or electrical power sources to a plurality of electrical power outputs or loads.

BACKGROUND

Today, a building site does not need to obtain all electrical power from the public utility grid, or simply, "grid". There are alternative energy sources (AES) to the grid, for example photovoltaic (PV) solar, wind, geothermal, etc., that may be available. In most cases, an AES is in close proximity to the building site. For example, in the case of the PV solar, the solar panel may be located adjacent to or on the roof of a building. In addition, the building site may have access to locally stored power, e.g., in the form of lithium ion batteries or fuel cells.

Prior art equipment configurations used to produce, convert, distribute, and store power for or to a building site are complex and expensive, with many pieces of equipment and many interfaces. What is needed is a simple, relatively inexpensive system to produce, convert, distribute and store electrical power for a building site. Such a system should direct power from one or more sources to meet the demand of one or more loads. The power provided to an internal DC bus in the system is equal to the power drawn from the DB bus and sent to the one or more loads. When the voltage on the DC bus is fixed, the current transmitted to the bus necessarily is the same as the current transmitted from the bus. Therefore, what is needed is a controller that adjusts or limits input current from the sources so the current transmitted to the bus is the same as the current transmitted from the bus.

BRIEF DESCRIPTION OF THE DRAWINGS

Embodiments are illustrated by way of example, and not by way of limitation, and can be more fully understood with reference to the following detailed description when considered in connection with the following figures, in which:

FIG. 4 is a signal timing diagram in accordance with an embodiment of the invention.

DETAILED DESCRIPTION

Figure 1:
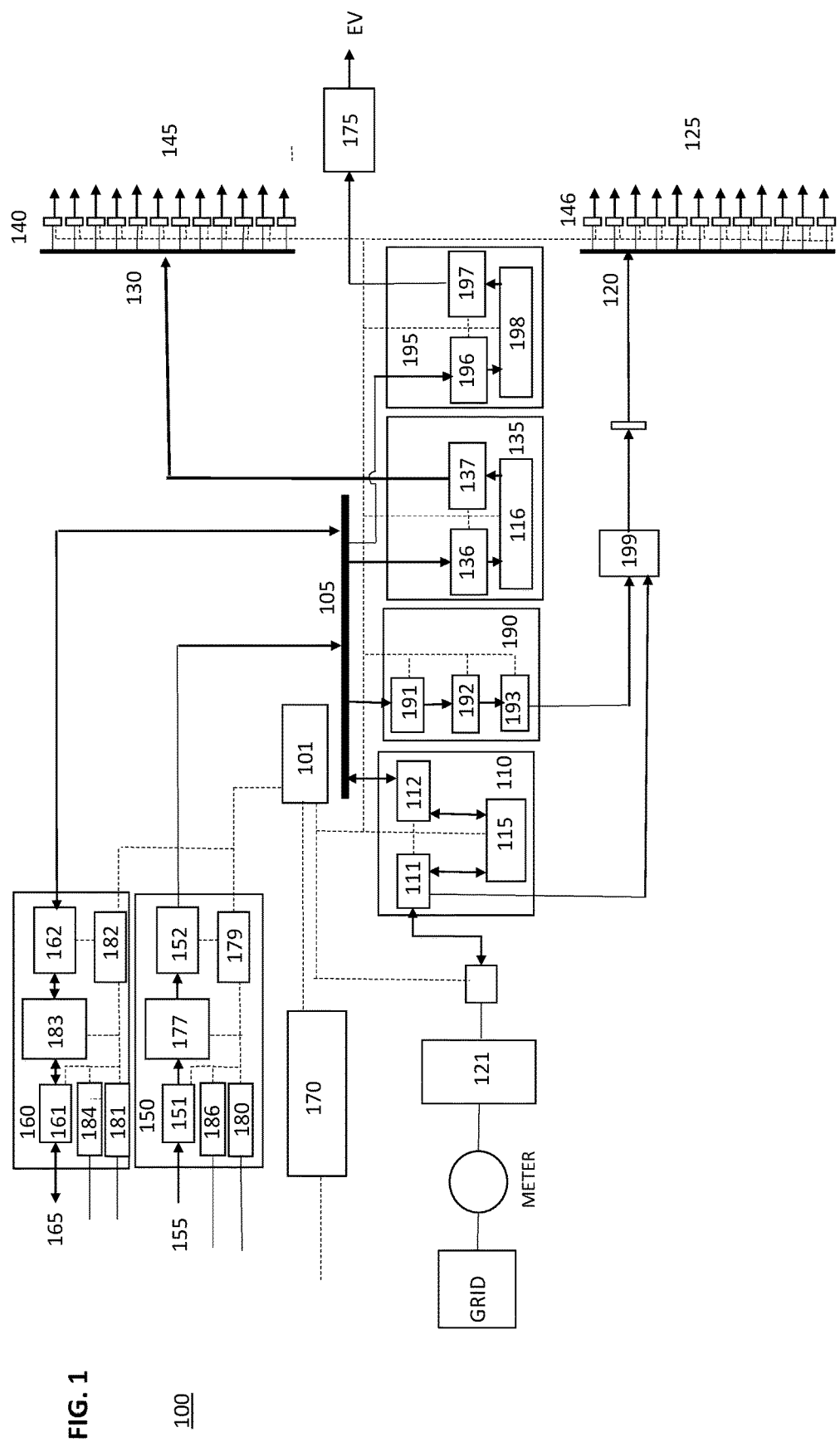
FIG. 1 illustrates an architecture for a power router in which an embodiment of the invention may be used.

With reference to FIG. 1, an electrical power distribution system 100 comprises a central electrical power switch or router that receives DC electrical power from or to one or more electrical power sources and transmits the DC electrical power to one or more electrical power loads. In one embodiment, a DC bus 105 receives and transmits electrical power at a first fixed DC voltage level, for example, 800 volts, from one or more electrical power sources to one or more electrical power loads. The embodiment further includes a number of DC power output ports 130 to transmit electrical power at a second fixed DC voltage level to a corresponding number of DC power loads 145. For example, in one embodiment, the second fixed DC voltage level is 60 volts. In one embodiment, each output port 130 connects the electrical power distribution system to an individual unit in a building site, for example, a single family dwelling. There may also be other output ports connected to an electrical load in common or shared among the individual units, such as building site lighting or a control panel for a fire alarm system.

A like number of current and voltage sensors 140 respectively monitor the current and voltage usage for each of the DC power output ports 130. These sensors and associated circuitry, among other things, detect an amount of DC transmitted by the DC power output ports 130 to the DC power loads 145. It is contemplated that the sensors 140 may be hierarchically arranged, wherein one sensor 140 communicates with the other sensors 140 and aggregates information or data about the current and/or voltage usage of the DC power loads and communicates on behalf of all the sensors 140 with a controller such as controller 101 described herein below. Alternatively, each sensor 140 may communicate individually with controller 101.

In one embodiment, a DC power output adapter 135 couples the DC bus 105 to the DC power output ports 130 to provide DC power to the DC power loads 145. The DC power output adapter comprises an input bus interface 136 that couples the DC power output adapter 135 to the DC bus, and an output interface 137 that couples the DC power output adapter to the DC power output ports 130. A DC-to-DC (DC/DC) converter 116 is coupled to the input bus interface 136 and the output interface 137 to receive and convert the electrical power transmitted on the DC bus at the first fixed DC voltage level to electrical power at the second fixed DC voltage level for transmission to the DC power output ports 130. In one embodiment, the DC/DC converter is a 10 kW DC/DC converter.

The embodiment further includes a number of alternating current (AC) power output ports 120 to transmit electrical power at a first fixed AC voltage level to a corresponding number of AC power loads 125. For example, in one embodiment, the first fixed AC voltage level is 240 volts AC (Vac). In one embodiment, each output port 120 connects the electrical power distribution system to an individual unit in the building site, for example, a single family dwelling. As in the case of output ports 130, there may be other output ports 120 connected to an electrical load in common or shared among the individual units.

A like number of current and voltage sensors 146 respectively monitor the current and voltage usage for each of the AC power output ports 120. These sensors and associated circuitry, similar to sensors 140, detect an amount of AC transmitted by the AC power output ports 120 to the AC power loads 125. It is contemplated that the sensors 146 may be hierarchically arranged, wherein one sensor 146 communicates with the other sensors 146 and aggregates information or data about the current and/or voltage usage of the AC power loads and communicates on behalf of all the sensors 146 with a controller such as controller 101. Alternatively, each sensor 146 may communicate individually with controller 101.

In one embodiment, an AC power input/output (I/O) adapter 110 couples the DC bus 105 to the AC power output ports 120 to provide AC power to the AC power loads 125. The AC power I/O adapter comprises an input/output bus interface 112 that couples the AC power I/O adapter 110 to the DC bus, and an input/output interface 111 that couples the AC power I/O adapter to the AC power output ports 120. A bi-directional AC-to-DC converter 115 is coupled to the input/output bus interface 112 and the input/output interface 111 to receive and convert the electrical power transmitted on the DC bus at the first fixed DC voltage level to electrical power at the first fixed AC voltage level for transmission to the AC power output ports 120. In one embodiment, the bidirectional AC/DC converter is a 50 kW bidirectional AC/DC converter.

The AC power I/O adapter 110 further is to couple to an AC power grid 121 (e.g., a public utility grid) to receive and convert electrical power transmitted from the AC power grid 121 at a second fixed AC voltage level to the electrical power at the first fixed AC voltage level for transmission to the AC power output ports 120. In one embodiment, the second fixed AC voltage level is 277 volts AC (Vac). The AC power I/O adapter 110 comprises an input/output interface 111 that couples the AC power I/O adapter to the AC power grid (or AC distribution panel connected therewith). In one embodiment, the AC/DC bidirectional converter 115 is coupled to the input/output interface 111 to receive and convert electrical power transmitted from the AC power grid at the second fixed AC voltage level to the electrical power at the first fixed DC voltage level for transmission to the DC bus via input/output interface 112, and to receive and convert the electrical power transmitted on the DC bus at the first fixed DC voltage level to the electrical power at the second fixed AC voltage level for transmission to the AC power grid. In other words, the electrical power distribution system 100 can feed back electrical power from the system to the grid, as conditions warrant.

In one embodiment, the AC/DC bidirectional converter 115 is coupled to the input/output interface 111 to receive and convert electrical power transmitted from the AC power grid at the second fixed AC voltage level to the electrical power at the first fixed AC voltage level for transmission to the AC power output ports 120 via input/output interface 111.

In one embodiment, an AC power output adapter 190 couples the DC bus 105 and to the plurality of AC power output ports 120 to provide AC power to the AC power loads 125. The AC power output adapter comprises an input bus interface 191 that couples the AC power output adapter to the DC bus, and an output interface 193 that couples the AC power output adapter to the AC power output ports 120. A DC-to-AC (DC/AC) converter 192 is coupled to the input bus interface 191 and the output interface 193 to receive and convert the electrical power transmitted on the DC bus at the first fixed DC voltage level to the electrical power at the first fixed AC voltage level for transmission to the AC power output ports. In an alternative embodiment, the AC/DC bidirectional converter 115 in the AC I/O power adapter 110 could provide the same functionality as DC/AC converter 192, but it would not provide the redundancy and failsafe functionality of having this functionality provided by DC/AC converter 192 located in the separate adapter 190.

In one embodiment, an DC power output adapter 195 couples to the DC bus 105 and to DC power output port 175 to provide DC power to a DC power load 175, such as an electric vehicle charging station. The DC power output adapter comprises an input bus interface 196 that couples the DC power output adapter to the DC bus, and an output interface 197 that couples the DC power output adapter to the DC power output port 175. A DC-to-DC (DC/DC) converter 198 is coupled to the input bus interface 196 and the output interface 197 to receive and convert the electrical power transmitted on the DC bus at the first fixed DC voltage level to electrical power a fixed DC voltage level for transmission to the DC power output port 175.

In one embodiment, a controller 101 is coupled to the DC power output adapter 135, the current and voltage sensors 140 to control an amount of the electrical power transmitted on the DC bus 105 at the first fixed DC voltage level that the DC power output adapter 135 is to receive and convert to the electrical power at the second fixed DC voltage level for transmission to the DC power output ports 130, based on the amount of DC transmitted by the DC power output ports to the DC power loads as detected by the current and voltage sensors 140.

In one embodiment, controller 101 is coupled to the AC power I/O adapter 110, and the current and voltage sensors 146, to control an amount of the electrical power transmitted from the AC power grid at the second fixed AC voltage level that the AC power I/O adapter 110 is to receive and convert to the electrical power at the first fixed AC voltage level for transmission to the AC power output ports 120, based on the amount of AC transmitted by the AC power output ports 120 to the AC power loads 125 as detected by current and voltage sensors 146.

In one embodiment, controller 101 is coupled to the DC power output adapter 135, the current and voltage sensors 140, and the AC power I/O adapter 110, to control an amount of the electrical power transmitted from the AC power grid at the second fixed AC voltage that the AC power I/O adapter 110 is to receive and convert to the electrical power at the first fixed DC voltage level for transmission to the DC bus 105, based on the amount of DC transmitted by the DC power output ports 130 to the DC power loads 145 detected by current and voltage sensors 140.

In one embodiment, controller 101 is coupled to the AC power output adapter 190 and the current and sensors 146, to control an amount of the electrical power transmitted on the DC bus 105 at the first fixed DC voltage level that the AC power output adapter 190 is to receive and convert to the electrical power at the first fixed AC voltage level for transmission to the AC power output ports 120, based on the amount of AC transmitted by the AC power output ports to the AC power loads as detected by the current and sensors 146.

In one embodiment, controller 101 is to control the amount of the electrical power transmitted on the DC bus 105 at the first fixed DC voltage level that the AC power I/O adapter 110 is to receive and convert to the electrical power at the second fixed AC voltage level for transmission to the AC power grid, based on one or more of the amount of DC transmitted by the plurality of DC power output ports 130 to the plurality of DC power loads 145 as detected by the first circuitry, the amount of AC transmitted by the plurality of AC power output ports 120 to the plurality of AC power loads 125 as detected by the second circuitry, the state of the DC power source, and the state of the DC power storage device.

In one embodiment, the electrical power distribution system further comprises a DC power input adapter 150 coupled to the DC bus 105 and to couple to a DC power source 155 to provide DC power to the electrical power distribution system. In one embodiment, the DC power source is an alternative energy source, such as a PV solar power source. The DC power input adapter includes an input interface 151 that couples the DC power input adapter 150 to the DC power source 155, and an output bus interface 152 that couples the DC power input adapter to the DC bus 105. A DC-to-DC (DC/DC) converter 177 is coupled to the input interface 151 and the output bus interface 152 to receive and convert electrical power transmitted by the DC power source at a third fixed DC voltage level to the electrical power transmitted on the DC bus at first fixed DC voltage level. In one embodiment, the third fixed DC voltage level is 1000 volts. In one embodiment, the DC/DC converter is a 1000 volt to 800 volt DC/DC converter.

Controller 101 further is coupled to the DC power input adapter 150 to control an amount of the electrical power at the third fixed DC voltage level that the DC power input adapter 150 is to receive and convert to electrical power at the first fixed DC voltage level for transmission on the DC bus 105.

The controller, in one embodiment, controls the amount of the electrical power at the third fixed DC voltage level that the DC power input adapter 150 is to receive and convert to electrical power at the first fixed DC voltage level for transmission on the DC bus 105, based on one or more of the amount of DC transmitted by the DC power output ports 130 to the DC power loads 145 as detected by the current and voltage sensors 140, the amount of AC transmitted by the AC power output ports 120 to the AC power loads 125 as detected by the current and voltage sensors 146, and the desirability of or the priority assigned to the electrical power transmitted from the AC power grid 121 at the second fixed AC voltage level relative to the desirability of or priority assigned to the electrical power transmitted by the DC power source 155 at a third fixed DC voltage level. The desirability of or priority assigned to the electrical power transmitted from the AC power grid 121 at the second fixed AC voltage level relative to the desirability of or priority assigned to the electrical power transmitted by the DC power source 155 at a third fixed DC voltage level may be based on, for example, one or more of unit price, environmental impact, availability, quality, stability, capacity, transmission or delivery efficiency, location or distance of a source, etc.

In one embodiment, DC power input adapter 150 includes parameter sensor 180 to detect a state of the DC power source 155. In such case, the controller 101 may control the amount of the electrical power at the third fixed DC voltage level that the DC power input adapter 155 is to receive and convert to electrical power at the first fixed DC voltage level for transmission on the DC bus 105 based on the state of the DC power source, or environmental factors that impact the state of the DC power source, such as, in the case where the DC power source is a PV solar power source, the temperature, wind, intensity and/or angle of incidence of sunlight to the DC power source, time of day, season, etc. In one embodiment, DC power input adapter 150 further includes a controller 186 in communication with DC power source 155 by which DC power input adapter 150 can control functionality of the DC power source 155.

The electrical power distribution system, in one embodiment, comprises a DC power input/output (I/O) adapter 160 coupled to the DC bus 105 and further to couple to a DC power storage device 165. The DC power I/O adapter includes an input/output interface 161 that couples the DC power I/O adapter to DC power storage device 165, and an input/output bus interface 162 that couples the DC power I/O adapter to the DC bus 105. A bi-directional DC/DC converter is coupled to the input/output interface 161 and the input/output bus interface 162 to receive and convert the electrical power transmitted on the DC bus 105 at the first fixed DC voltage level to an electrical power transmitted to the DC power storage device 165 at a fourth fixed DC voltage level, and to receive and convert the electrical power transmitted from the DC power storage device 165 at the fourth fixed DC voltage level to the electrical power transmitted on the DC bus 105 at the first fixed DC voltage level. In one embodiment, the fourth fixed DC voltage level is 400 volts. In one embodiment, the DC/DC converter is a 400 volt to 800 volt DC/DC converter. In one embodiment, the DC power storage device is a Lithium-ion battery, and may include a battery management system.

In one embodiment, the controller 101 further is coupled to the DC power I/O adapter 160 to control an amount of the electrical power transmitted on the DC bus 105 at the first fixed DC voltage level that the DC power I/O adapter is to receive and convert to electrical power at the fourth fixed DC voltage level for transmission to the DC power storage device 165. In one embodiment, the amount of the electrical power transmitted on the DC bus 105 at the first fixed DC voltage level that the DC power I/O adapter 160 is to receive and convert to electrical power at the fourth fixed DC voltage level for transmission to the DC power storage device 165 is based on one or more of the amount of DC transmitted by the DC power output ports 130 to the DC loads 145 as detected by the current sensors 140, the amount of AC transmitted by the AC power output ports 120 to the AC loads 125 as detected by the current sensors 146, and the amount of the electrical power transmitted by the DC power source 160 at the third fixed DC voltage level.

In another embodiment, the controller further is to control an amount of the electrical power at the fourth fixed DC voltage level that the DC power I/O adapter 160 is to receive and convert for transmission on the DC bus 105 at the first fixed DC voltage level. The controller may do so based on one or more of the amount of DC transmitted by the DC power output ports 130 to the DC loads 145 as detected by the current sensors 140, the amount of AC transmitted by the AC power output ports 120 to the AC loads 125 as detected by the current sensors 146, the amount of the electrical power transmitted by the DC power source 155 at the third fixed DC voltage level, the desirability of or priority assigned to the electrical power transmitted from the AC power grid 120 at the second fixed AC voltage level relative to the desirability of or priority assigned to the electrical power transmitted by the DC power I/O adapter 165 at the fourth fixed DC voltage level, and the desirability of or priority assigned to the electrical power transmitted from the DC power source 155 at the third fixed DC voltage level relative to the desirability of or priority assigned to the electrical power transmitted by the DC power I/O adapter 165 at the fourth fixed DC voltage level. In these embodiments, desirability of or priority assigned to a particular electrical power source may be based on, for example, one or more of unit price, environmental impact, availability, quality, stability, capacity, transmission or delivery efficiency, location or distance of a source, etc.

In one embodiment, DC power I/O adapter 160 includes parameter sensor 181 to detect a state of the DC power storage device 165. In such case, the controller 101 may control the amount of the electrical power at the fourth fixed DC voltage level that the DC power I/O adapter 155 is to receive and convert to electrical power at the first fixed DC voltage level for transmission on the DC bus 105 based on the state of the DC power storage device, or factors that impact the state of the DC power storage device. In one embodiment, DC power I/O adapter 160 further includes a controller 184 in communication with DC power storage device 165 by which DC power I/O adapter 160 can control functionality of the DC power storage device 165.

In one embodiment, controller 101 is a central controller located within the electrical power distribution system and communicates with a microcontroller or the like located in each component it controls, for example, microcontrollers 180 and 181 respectively located in adapters 150 and 160. In another embodiment, the controller may be a distributed controller system, wherein each component described herein as being in communication with the controller may in fact incorporate or communicate with its own controller or a controller shared with a subset of the components in the electrical power distribution system. The controllers in such case communicate with each other as needed in order to perform the functions described herein. In all cases, the controller(s) may be hardwired in communication with the components and/or may be wirelessly in communication with the components. In another embodiment, an external controller 170 communicates with the controller(s). Controller 170 may be a part of a cloud-computing based energy management system and connect to controller 101 via the Internet, for example.

Embodiments of the invention can further be described as an electrical power distribution system 100 that includes an electrical power router. The power router has a number of input ports and a number of output ports, and distributes an electrical signal received on one or more of the input ports to one or more of the output ports. In one embodiment, the electrical power router is a common direct current (DC) bus with a number of bus interfaces. In such an embodiment, an electrical input adapter, e.g., DC power input adapter 150, is coupled to one of the electrical power router's input ports and further to couple to an electrical power source, e.g., PV solar power source 155. The electrical input adapter receives and converts an electrical signal input from the electrical power source to the electrical signal distributed by the power router. The electrical input adapter in such an embodiment includes an interface, e.g., interface 151, with the electrical power source that has electrical and mechanical characteristics that match those of the electrical power source, and an interface, e.g., interface 152, with the electrical power router that has electrical and mechanical characteristics that match those of the electrical power router.

Further in such an embodiment, an electrical output adapter, e.g., DC power output adapter 135, is coupled to one of the output ports and further to couple to an electrical power load, e.g., DC power loads 145. The electrical output adapter receives and converts the electrical signal distributed by the power router from the one of the output ports to an electrical signal output to the electrical power load. The electrical output adapter includes an interface, e.g., interface 137, with the electrical power load that has electrical and mechanical characteristics that match those of the electrical power load, and an interface, e.g., interface 136, with the electrical power router that has electrical and mechanical characteristics that match those of the electrical power router.

The embodiment further includes a controller 101 coupled to the electrical input adapter, the electrical output adapter, and the electrical power router, to control transmission of the electrical signal from the electrical input adapter to the electrical output adapter through the electrical power router. A subset of the bus interfaces have an electrical circuit coupled to the DC bus and to couple to a DC voltage output of an AC to DC converter or DC to DC converter of the electrical input adapter. The subset of the bus interfaces control an amount of current provided in the electrical signal to be distributed by the power router.

In one embodiment of the electrical distribution system, the subset of bus interfaces control the amount of current provided in the electrical signal to be distributed by the power router by performing one or more of the functions of: current direction control, current limit control, current magnitude control, current sensing, voltage sensing and voltage control on an input to the electrical circuit, voltage sensing and voltage control on an output of the electrical circuit.

In this embodiment, a second subset of the bus interfaces includes an electrical circuit coupled to the DC bus and to couple to a DC voltage input of a DC to DC converter or DC to AC converter of the electrical output adapter. The second subset of the bus interfaces control an amount of current received from the electrical signal distributed by the power router.

In one embodiment, the second subject of bus interfaces controls the amount of current received from the electrical signal distributed by the power router by performing one or more of the functions of: current direction control, current limit control, current magnitude control, current sensing, voltage sensing and voltage control on the input to the electrical circuit, voltage sensing and voltage control on the output of the electric circuit.

Figure 2:
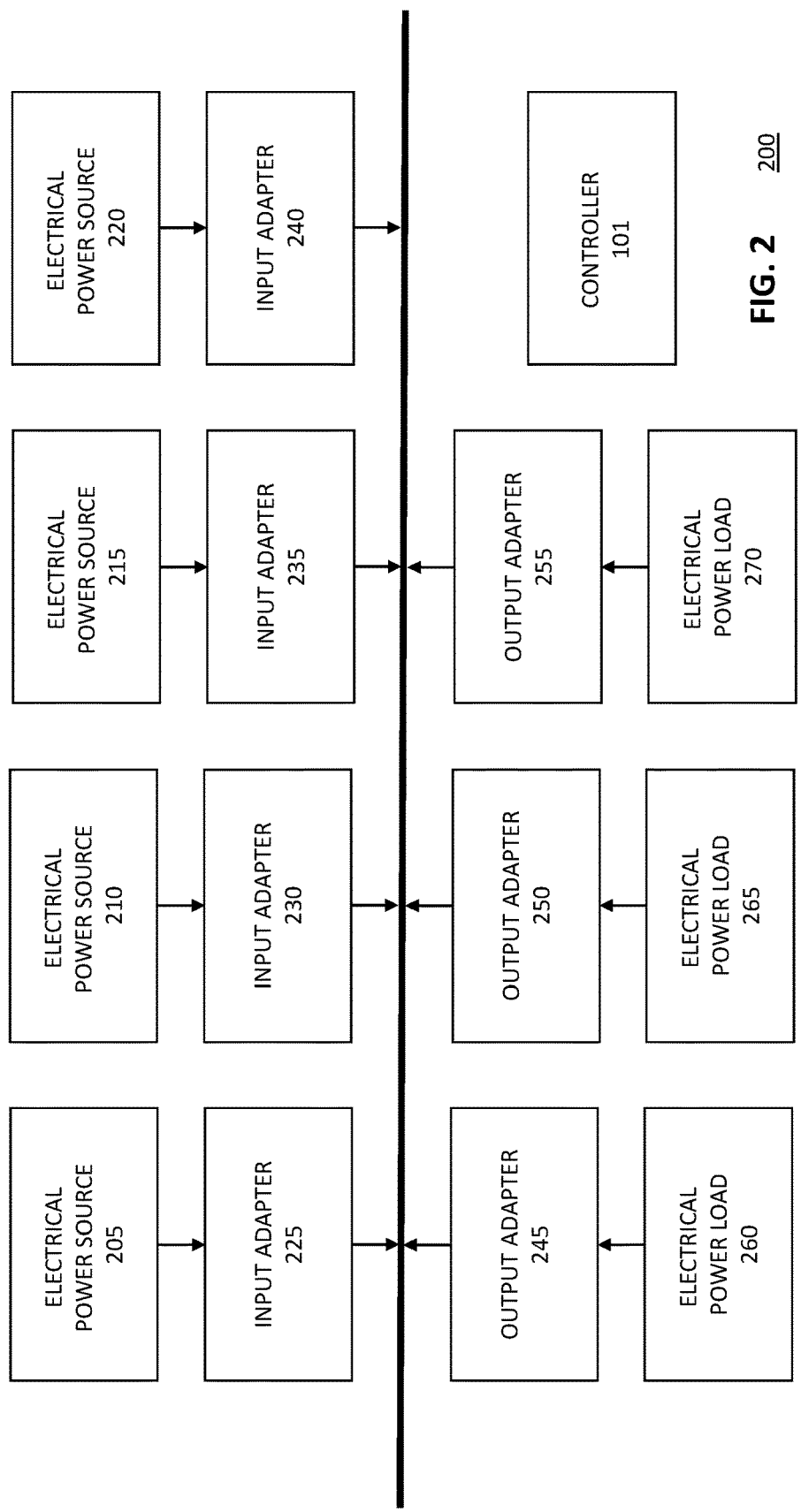
FIG. 2 illustrates a simplified functional block diagram of the architecture of the power router that may be used by an embodiment of the invention.

FIG. 2 depicts a simplified version of the architecture described herein with reference to FIG. 1, depicting one or more electrical power sources 205-220 coupled to one or more corresponding input adapters 225-240, which in turn are connected to bus 105. Likewise, one or more electrical power loads 260-270 are coupled to one or more corresponding output adapters 245-255, which in turn are connected to bus 105. Controller 101 is coupled to each of the aforesaid components—lines depicting a connection between the controller 101 and each of the components are not shown to avoid complicating the drawing.

One of the objectives of the power router described herein is to direct electrical power from the electrical power sources to meet the demand of the electrical power loads. This suggests that the power supplied to the DC bus 105 is equal to the power drawn off the DC bus to the electrical power loads. According to certain embodiments, given the voltage of the DC bus is fixed, then the current being supplied to the DC bus (i.e., current in) is equal to the current being provided by the DC bus (i.e., current out). In one embodiment, the current supplied to the DC bus is the sum of the average currents from each of the of the input adapters:

$$DC \text{ bus current in} = I_{in,225} + I_{in,230} + I_{in,235} + I_{in,240}$$

and the current out of the DC bus is the sum of the average currents to each of the output adapters:

$$DC \text{ bus current out} = I_{out,245} + I_{out,250} + I_{out,255}$$

therefore, the controller 101, according to an embodiment, will measure each of the $I_{out}$ and then adjust each of the input adapter currents such that:

$$I_{in,225} + I_{in,230} + I_{in,235} + I_{in,24} = I_{out,245} + I_{out,250} + I_{out,255}$$

Figure 3:
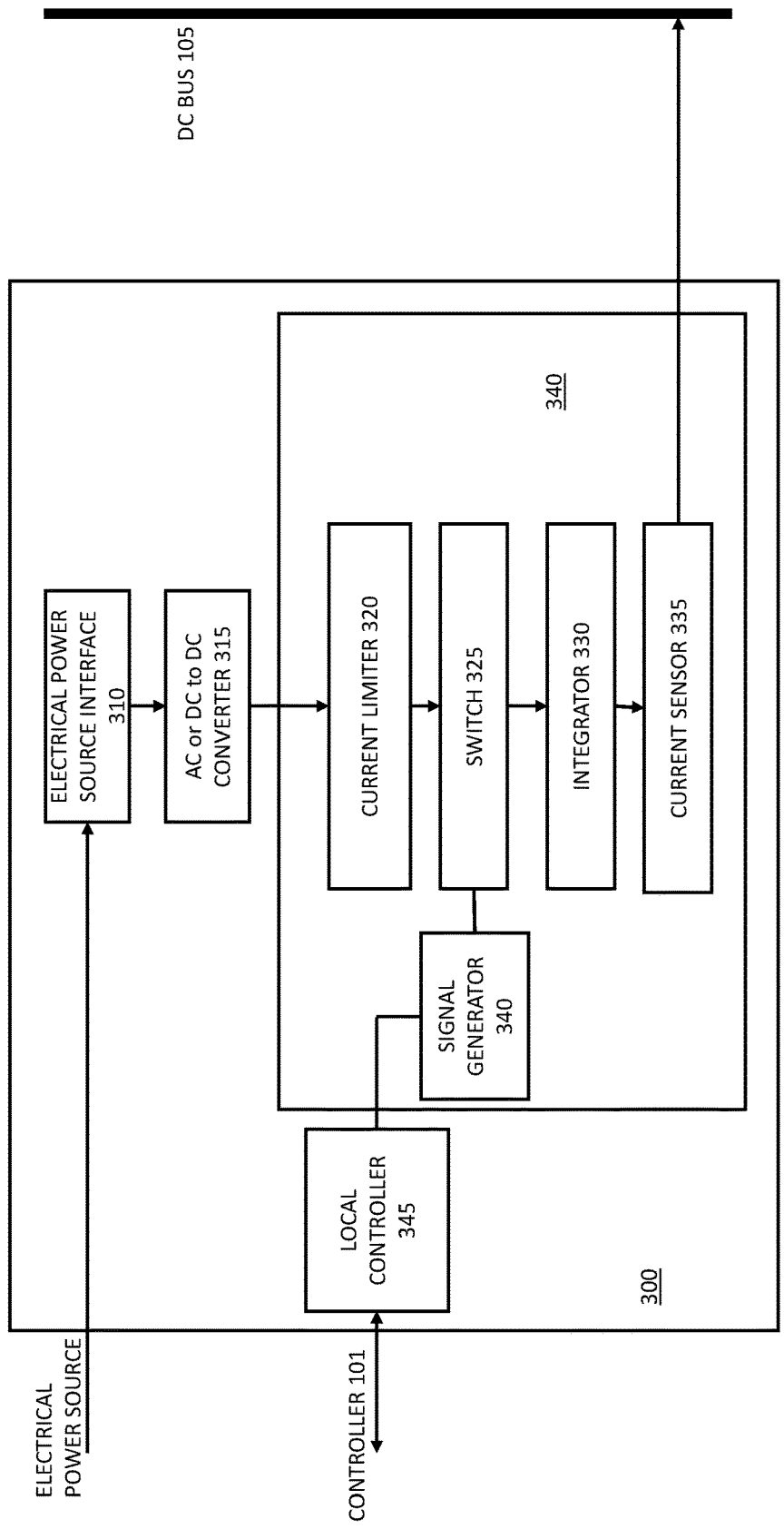
FIG. 3 is a block diagram of an embodiment of the invention.

Embodiments of the invention accordingly provide a means for digitally controlling the DC current supplied to the DC bus from the input adapters 225-240, as described below with reference to FIG. 3. An input adapter 300 includes the following functional building blocks: an interface to an electrical power source, an AC or DC to DC converter 315, an interface 340 to the DC bus 105, and a local controller 345 for the input adapter. Embodiments of the invention further provide means for the input adapter interface to the DC bus to control the input current $I_{in,I\ to\ the}$ DC bus. Such means include a current limiter 320. In one embodiment, the AC or DC to DC converter 315 includes the current limiter internal or there is an external current limiter as depicted in FIG. 3. In one embodiment, the current limiter has less than a 0.5 volt drop. So, for example, if the DC bus voltage operates at approximately 800 volts, then only 0.06% power is lost across the current limiter. In one embodiment, there is an input/control signal (not shown) that drives or controls the current limiter. In one embodiment, the current limiter operates at a specific value of current, and is not programmable, depending on the environment. For example, if the electrical power source to which the input adapter is connects is the AC grid or a battery, the current may be fixed, whereas when connected to photovoltaic (solar power) sources, the current limiter may be programmable.

The interface 340 further includes a high speed, low voltage drop on/off switch 325. Switch 325 is a semiconductor switch in one embodiment, with high power ratings and with ON to OFF and OFF to ON times less than with requirements of the signal generator timing. The interface 340 further includes a controller 345 and signal generator 345. In one embodiment, the signal generator 240 may be internal to the controller 345, however, for illustrative purposes it shown to be a separate component. Likewise, both the controller and signal generator may be included in the switch 325 in one embodiment, even though illustrated as separate functional elements in FIG. 3.

The signal generator 340 produces a pulse of programmable width and fixed period of a signal/cycle time, according to one embodiment. In an alternative embodiment, the pulse width may be of a fixed width and the total period/cycle time is programmable. The intent in either embodiment is to produce a waveform of programmable duty cycle, D, where D=PW/T, where pulse width (PW) is pulse active time and T is the total period or cycle time of the signal. In one embodiment, the controller calculates what current it needs from each electrical power source and adjusts the duty cycle of the waveform to obtain a needed average current.

Interface 340 further includes an integrator, which is a circuit that smoothes the pulse waveform into a DC waveform, and a current sensor, which may be a simple version based on a low-ohm sense resistor in one embodiment.

These embodiment assume that when switch 325 is in the "ON" state, then $I_{in,I}=I_{limit}$.

According to one embodiment, controller 101 polls all currents sensors on the input and output adaptors and determines the required current set points for each input adapter, that is, the controller 101 calculates target values for $I_{in,225}$, $I_{in,230}$, $I_{in,235}$ and $I_{in,240}$ as y1, y2, y3, and y4. Considering just the case of input adapter 225, assuming $I_{limit}>y1$, then the applied duty cycle from the signal generator 340 is DC=y1/$I_{limit}$. After the new duty cycle has been applied then controller 345 can measure 6,225 and adjust accordingly. As can be seen with reference to FIG. 4, the signal 400 from the signal generator 340 to the switch 325 is illustrated, wherein the duty cycle of the signal is=T2/T1. The switch 325 adjusts the current $I_{limit}$ received from current limiter 320 accordingly, as shown in the signal depicted at 405, wherein the duty cycle of the $I_{limit}$ signal is also=T2/T1. Finally, the current output from the integrator 330 is adjusted according to DC*$I_{limit}$, as depicted in signal 410.

Thus, embodiments of the invention relate to an apparatus comprising a programmable switch having an input to receive a DC power signal transmitted at a fixed voltage and at a first amperage. The programmable switch transmits the DC power signal at the fixed voltage and at the first amperage. A controller coupled to the programmable switch controls when, within a period of time, the programmable switch is to transmit the DC power signal at the fixed voltage and at the first amperage. An integrator, having an input coupled to the programmable switch and having an output coupled to a DC bus, receives the DC power signal at the fixed voltage and at the first amperage when transmitted within the period of time, converts the DC power signal at the fixed voltage and at the first amperage to a DC power signal at the fixed voltage and at a second amperage that is proportional to the first amperage integrated over the period of time, and transmits the DC power at the fixed voltage and at the second amperage for the period of time to the DC bus.

According to one embodiment, the apparatus further comprises a current limiter having an input coupled to an output of an electrical converter to receive a DC power signal at a second voltage different than the fixed voltage and at a third amperage greater than the first amperage, a circuit to limit the third amperage of the DC power signal to the first amperage, and an output coupled to the input of the programmable switch to transmit the DC power signal at the second voltage and at the first amperage.

One embodiment of the invention relates to an electrical power input adapter coupled to a direct current (DC) bus in a power distribution system. The input adapter includes a first interface having an input to couple to an electrical power supply to receive one of an alternating current (AC) power signal and a DC power signal at a first voltage level transmitted from the electrical power supply, and having an output to transmit the one of the alternating current (AC) power signal and the DC power signal at the first voltage. The input adapter further includes an electrical converter having an input coupled to the output of the first interface to receive and convert the one of the AC power signal and the DC power signal at the first voltage to a DC power signal at a second fixed voltage, and having an output to transmit the DC power signal at the second voltage.

The input adapter has a second interface that includes a current limiter having an input coupled to the output of the electrical converter to receive and limit an amperage of the DC power signal at the second voltage, and having an output to transmit the DC power signal at the second voltage and at the limited amperage. A programmable switch is coupled to the output of the current limiter to receive the DC power signal at the second voltage and at the limited amperage and transmit the DC power signal at the second voltage and at the limited amperage. A controller is coupled to the programmable switch to control when, within a period of time, the programmable switch is to transmit the DC power signal at the second voltage and at the limited amperage. An integrator, having an input coupled to the programmable switch and having an output coupled to the DC bus, receives the DC power signal at the second voltage and at the limited amperage when transmitted within the period of time, converts the DC power signal at the second voltage and at the limited amperage to a DC power signal at the second voltage and at a second amperage that is proportional to the limited amperage integrated over the period of time, and transmits the DC power at the second voltage and at the second amperage for the period of time to the DC bus.

In one embodiment, the programmable switch has an input coupled to the output of the current limiter to receive the DC power at the second voltage and at the limited amperage, an output to transmit the DC power at the second voltage and at the limited amperage, and a control input to receive a control signal to control when, within the period of time, the output of the switch transmits the DC power at the second voltage and at the limited amperage.

In one embodiment, the programmable switch includes a control module coupled to the control input of the switch. The control module provides the control signal to control when, within the period of time, the output of the switch transmits the DC power at the second voltage and at the limited amperage.

In one embodiment, the control module includes a controller, and a signal generator having an input coupled to the controller and an output coupled to the control input of the switch. The controller generates the control signal to control when, within the period of time, the output of the switch transmits the DC power at the second voltage and at the limited amperage.

In one embodiment, the signal generator that generates the control signal to control when, within the period of time, the output of the switch transmits the DC power at the second voltage and at the limited amperage, generates a digital signal with a duty cycle for the period of time according to an instruction the controller transmits to the signal generator. In such an embodiment, the control module controls the output of the switch to transmit the DC power at the second voltage and at the limited amperage during the duty cycle of the digital signal transmitted from the signal generator to the switch.

In one embodiment, the integrator received the DC power signal at the second voltage and at the limited amperage when transmitted within the period of time, and converts the DC power signal at the second voltage and at the limited amperage to the DC power signal at the second voltage and at the second amperage that is proportional to the limited amperage integrated over the period of time. In such an embodiment, the integrator receives the DC power at the second voltage and at the limited amperage for the duration of the duty cycle of the digital signal transmitted from the signal generator to the switch, and reduce the limited amperage according to the duration of the duty cycle of the digital signal relative to the duration of the period of time to obtain the DC power at the second voltage and the second amperage that is proportional to the limited amperage integrated over the period of time.

In one embodiment, the controller selects the second amperage at which the integrator is to transmit the DC power at the second voltage and at the second amperage for the period of time to the DC bus. In such an embodiment, the controller transmits the instruction to the signal generator to generate the digital signal with the duty cycle for the period of time based on a ratio of the second amperage to the limited amperage.

One embodiment of the apparatus further includes a current sensor coupled to the DC bus and to an input of the controller. The sensor measures electrical current on the DC bus and sends an indication of the measure of electrical current on the DC bus to the controller. In such an embodiment, the controller selects the second amperage based on the indication of the measure of electrical current on the DC bus sent to the controller by the current sensor.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims that follow. Features of the disclosed embodiments can be combined and rearranged in various ways.

What is claimed is:

1. An electrical power input adapter coupled to a direct current (DC) bus in a power distribution system, comprising:
   a first interface having an input to couple to an electrical power supply to receive one of an alternating current (AC) power signal and a DC power signal at a first voltage level transmitted from the electrical power supply, and having an output to transmit the one of the alternating current (AC) power signal and the DC power signal at the first voltage;
   an electrical converter having an input coupled to the output of the first interface to receive and convert the one of the AC power signal and the DC power signal at the first voltage to a DC power signal at a second fixed voltage, and having an output to transmit the DC power signal at the second voltage;
   a second interface comprising:
      a current limiter having an input coupled to the output of the electrical converter to receive and limit an amperage of the DC power signal at the second voltage, and having an output to transmit the DC power signal at the second voltage and at the limited amperage;
      a programmable switch coupled to the output of the current limiter to receive the DC power signal at the second voltage and at the limited amperage and transmit the DC power signal at the second voltage and at the limited amperage;
      a controller coupled to the programmable switch to control when, within a period of time, the programmable switch is to transmit the DC power signal at the second voltage and at the limited amperage;
      an integrator, having an input coupled to the programmable switch and having an output coupled to the DC bus, to:
         receive the DC power signal at the second voltage and at the limited amperage when transmitted within the period of time;
         convert the DC power signal at the second voltage and at the limited amperage to a DC power signal at the second voltage and at a second amperage that is proportional to the limited amperage integrated over the period of time; and
         transmit the DC power at the second voltage and at the second amperage for the period of time to the DC bus.

2. The apparatus of claim 1, wherein the programmable switch comprises:
   a switch having an input coupled to the output of the current limiter to receive the DC power at the second voltage and at the limited amperage;
   an output to transmit the DC power at the second voltage and at the limited amperage; and
   a control input to receive a control signal to control when, within the period of time, the output of the switch transmits the DC power at the second voltage and at the limited amperage.

3. The apparatus of claim 2, wherein the programmable switch further comprises a control module coupled to the control input of the switch, the control module to provide the control signal to control when, within the period of time, the output of the switch transmits the DC power at the second voltage and at the limited amperage.

4. The apparatus of claim 3, wherein the control module comprises:
a controller; and
a signal generator, having an input coupled to the controller and an output coupled to the control input of the switch, that generates the control signal to control when, within the period of time, the output of the switch transmits the DC power at the second voltage and at the limited amperage.

5. The apparatus of claim 4, wherein the signal generator that generates the control signal to control when, within the period of time, the output of the switch transmits the DC power at the second voltage and at the limited amperage, generates a digital signal with a duty cycle for the period of time according to an instruction the controller transmits to the signal generator; and
wherein the control module coupled to the switch to control when, within the period of time, the output of the switch transmits the DC power at the second voltage and at the limited amperage comprises the control module to control the output of the switch to transmit the DC power at the second voltage and at the limited amperage during the duty cycle of the digital signal transmitted from the signal generator to the switch.

6. The apparatus of claim 5, wherein the integrator to receive the DC power signal at the second voltage and at the limited amperage when transmitted within the period of time, and convert the DC power signal at the second voltage and at the limited amperage to the DC power signal at the second voltage and at the second amperage that is proportional to the limited amperage integrated over the period of time, comprises the integrator to receive the DC power at the second voltage and at the limited amperage for the duration of the duty cycle of the digital signal transmitted from the signal generator to the switch, and reduce the limited amperage according to a duration of the duty cycle of the digital signal relative to a duration of the period of time to obtain the DC power at the second voltage and the second amperage that is proportional to the limited amperage integrated over the period of time.

7. The apparatus of claim 5,
wherein the controller to select the second amperage at which the integrator is to transmit the DC power at the second voltage and at the second amperage for the period of time to the DC bus; and wherein the controller transmits the instruction to the signal generator to generate the digital signal with the duty cycle for the period of time based on a ratio of the second amperage to the limited amperage.

8. The apparatus of claim 7, wherein the apparatus further comprises a current sensor coupled to the DC bus and to an input of the controller, the sensor to measure electrical current on the DC bus and send an indication of the measure of electrical current on the DC bus to the controller; and
wherein the controller to select the second amperage based on the indication of the measure of electrical current on the DC bus sent to the controller by the current sensor.

9. An apparatus, comprising:
a programmable switch having an input to receive a DC power signal transmitted at a fixed voltage and at a first amperage and transmit the DC power signal at the fixed voltage and at the first amperage;
a controller coupled to the programmable switch to control when, within a period of time, the programmable switch is to transmit the DC power signal at the fixed voltage and at the first amperage;
an integrator, having an input coupled to the programmable switch and having an output coupled to a DC bus, to:
receive the DC power signal at the fixed voltage and at the first amperage when transmitted within the period of time;
convert the DC power signal at the fixed voltage and at the first amperage to a DC power signal at the fixed voltage and at a second amperage that is proportional to the first amperage integrated over the period of time; and
transmit the DC power at the fixed voltage and at the second amperage for the period of time to the DC bus.

10. The apparatus of claim 9, further comprising:
a current limiter having:
an input coupled to an output of an electrical converter to receive a DC power signal at a second voltage different than the fixed voltage and at a third amperage greater than the first amperage;
a circuit to limit the third amperage of the DC power signal to the first amperage;
an output coupled to the input of the programmable switch to transmit the DC power signal at the second voltage and at the first amperage.

* * * * *